United States Patent
Gamet et al.

(10) Patent No.: US 9,651,775 B2
(45) Date of Patent: May 16, 2017

(54) MEMS DEVICE

(71) Applicant: Intel Corporation, Santa Clara, CA (US)

(72) Inventors: Julien Gamet, Saint Pierre d'Allevard (FR); Faouzi Khechana, Crissier (CH)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/654,465

(22) PCT Filed: Dec. 20, 2012

(86) PCT No.: PCT/EP2012/076259
§ 371 (c)(1),
(2) Date: Jun. 19, 2015

(87) PCT Pub. No.: WO2014/094850
PCT Pub. Date: Jun. 26, 2014

(65) Prior Publication Data
US 2015/0338645 A1    Nov. 26, 2015

(51) Int. Cl.
*G02B 26/08*    (2006.01)
*G02B 26/10*    (2006.01)
*G02B 7/00*     (2006.01)

(52) U.S. Cl.
CPC ........... *G02B 26/101* (2013.01); *G02B 7/008* (2013.01); *G02B 26/085* (2013.01)

(58) Field of Classification Search
CPC .. G02B 26/085; G02B 26/0841; G02B 26/01; G02B 7/008; B81B 2207/015; B81B 3/0062; B81B 7/04

(Continued)

(56) References Cited

U.S. PATENT DOCUMENTS 6,791,731 B2 * 9/2004 Ryu ..................... G02B 26/085
                                                       359/200.7
6,989,921 B2 * 1/2006 Bernstein ............. B81B 3/0062
                                                       359/224.1

(Continued)

FOREIGN PATENT DOCUMENTS

EP      1215518 A1      6/2002
WO   2012130612 A1    10/2012

OTHER PUBLICATIONS

International Search Report, Mailed Date: Sep. 17, 2013, Application No. PCT/EP2012/076259, Filed Date: Dec. 20, 2012 pp. 6.

*Primary Examiner* — Euncha Cherry

(57) ABSTRACT

A MEMS micro-mirror device comprising, a MEMS micro-mirror, a support structure and, a first and second torsional arm which each connect the MEMS micro-mirror to the support structure, wherein the first and second torsional arms are arranged to define a first oscillation axis about which the MEMS micro-mirror can oscillate; a single actuation coil for oscillating the MEMS micro mirror about the first oscillation axis, at least a portion of the single actuation coil being arranged to cooperate with the MEMS micro mirror; a magnet which is arranged such that a magnetic field generated by the magnet submerges at least the portion of the single actuation coil which cooperates with the MEMS micro mirror; wherein the single actuation coil is configured to extend along the first and second torsional arms.

23 Claims, 4 Drawing Sheets

(58) Field of Classification Search
USPC .............................. 359/200.7, 224.1, 199.4
See application file for complete search history.

(56) References Cited

U.S. PATENT DOCUMENTS

| | | |
|---|---|---|
| 7,724,411 B2 | 5/2010 | Ko et al. |
| 2004/0070806 A1 | 4/2004 | Ryu et al. |

\* cited by examiner

MEMS DEVICE

FIELD OF THE INVENTION

The present invention concerns a MEMS device, and in particularly, but not exclusively, to a MEMS device which comprises a single actuation coil which is used to oscillate a MEMS micro-mirror, and wherein equal lengths of the single actuation coil are arranged to cooperate with each of a plurality of torsional arms which are attached to the MEMS mirror.

DESCRIPTION OF RELATED ART

A MEMS micro-mirror device is a device that contains an optical MEMS (Micro-Electrical-Mechanical-System). The optical MEMS micro-mirror device may comprise an elliptical, cylindrical, rectangular, square or random shape micro-mirror that is adapted to move and to deflect light over time. The micro-mirror is connected by torsional arms to a fixed part and can tilt and oscillate along one or two axis. For example it can oscillate vertically and horizontally. Different actuation principles can be used, including electrostatic, thermal, electro-magnetic or piezo-electric. MEMS micro-mirror devices are known in which the area of these micro-mirrors are around a few mm². In this case, the dimensions of the MEMS micro-mirror device, comprising the packaging, is around ten mm². This MEMS micro-mirror device is usually made of silicon, and can be encapsulated in a package that can include the driving actuation electronics. Various optical components, such as for example lenses, beam combiner, quarter-wave plates, beam splitter and laser chips, are assembled with the packaged MEMS to build a complete system.

A typical application of the MEMS micro-mirror devices is for optical scanning and projection systems. In a projection system, a 2-D or 3-D image or video can be displayed on any type of projection surface. In a colour system, each pixel of the image is generated by combining modulated red, green and blue laser light, by means of, for example, a beam combiner, to generate a combined light beam which defines a pixel of the image or video. The MEMS micro-mirror in the MEMS micro-mirror device directs the combined light beam to a projection surface where the pixel of the image or video is displayed. Successive pixels of the image or video are display in this manner. By means of its oscillations, the MEMS micro-mirror within the MEMS micro-mirror device will continuously scan the combined light beam from left to right and from top to bottom (or according to a different trajectory including e.g. Lissajou trajectories) so that all the pixels of the image, or video, are displayed on the projection surface, successively, pixel-by-pixel. The MEMS micro-mirror will oscillate about its oscillation axes at a frequency which ensures that the combined light beam is scanned across the projection surface at such a speed that a complete image is visible to a person viewing.

Typically, the MEMS micro-mirror in a MEMS micro-mirror device is able to oscillate along a single oscillation axis. Therefore, in order to display a 2-D image on a screen a projection system will require two MEMS micro-mirror devices; a first MEMS micro-mirror device which is required to scan the combined light beam along the horizontal and a second MEMS micro-mirror device which is required to scan the combined light beam along the along the vertical. Alternatively the MEMS micro-mirror in a MEMS micro-mirror device could be configured such that it can be oscillated about two orthogonal oscillation axes.

Referring now to FIGS. 1a and 1b which show a known MEMS micro-mirror device 1. FIG. 1a provides a plan view of the MEMS micro-mirror device 1 and FIG. 1b shows a cross sectional view of the MEMS micro-mirror device 1, taken along A-A' of FIG. 1a.

The MEMS micro-mirror device 1 comprises a first support frame 2. A first torsional arm 3a and second torsional arm 3b connect a MEMS micro mirror 4 to the support frame 2. In this embodiment the support frame 2 is fixed (i.e. immovable). The first and second torsional arms 3a,b define a first oscillation axis 7 for the MEMS micro mirror 4. A first actuation coil 5 is supported on, and connected to, the MEMS micro mirror 4. The first actuation coil 5 is arranged to extend, from a first electrical contact 9a which is located on the support frame 2, along the first torsional arm 3a, around the perimeter of the MEMS micro mirror 4 and back along the first torsional arm 3a to a second electrical contact 9b which is located on the support frame 2. It should be noted that the actuation coil does not extend along the second torsional arm 3b.

Collectively, the first support frame 2, first and second torsional arms 3a,b and the MEMS micro mirror 4, and first actuation coil 5, define collectively a MEMS die 10. As shown in FIG. 1b the MEMS die 10 is arranged in cooperation with a magnet 6 such the first actuation coil 5 is submerged in the magnetic field 'B' generated by the magnet 6.

During use an electric current 'I' is passed through the first actuation coil 5. As the first actuation coil 5 is submerged in the magnetic field 'B' created by the magnet 6, the actuation coil 5 will provide a Laplace force which will be applied to the MEMS micro mirror 4. The Laplace force will cause the MEMS micro mirror 4 to oscillate about its first oscillation axis 7.

However, as current is passed through the first actuation coil 5 the first actuation coil 5 will heat; this will result in an increase in the temperature of the first torsional arm 3a. The mechanical properties of the first torsional arm 3a will be influenced by the increase in temperature. As a result the mechanical properties of the first torsional arm 3a will differ from the mechanical properties of the second torsional arm 3b. For example as the first actuation coil 5 heats, the first torsional arm 3a will heat and the flexibility of the first torsional arm 3a will increase; as a result the first torsional arm 3a will be more flexible than the second torsional arm 3b. Due to the difference in flexibility between the first and second torsional arms 3a,b, undesired parasitic movement of the MEMS micro mirror 4 can result when the MEMS micro mirror is oscillated about its first oscillation axis 7.

In addition to the mechanical properties of the first torsional bar 3a, the electrical properties of the first actuation coil 5 will also be influenced by the increase in temperature. The electrical resistance of the first actuation coil 5 will increase with temperature. To maintain a predetermined scanning amplitude of the MEMS micro-mirror 4 the Laplace force applied by the first actuation coil 5 to the MEMS micro-mirror 4 must be maintained; to maintain the Laplace force a predetermined current which is conducted in the first actuation coil 5 must be maintained. As the electrical resistance of the first actuation coil 5 increases with increasing temperature, a larger voltage is required to maintain the current at the predetermined current level so that the Laplace force is maintained. The requirement for a larger voltage means that the MEMS micro-mirror device 1 will have increased power consumption.

It will be understood that the temperature in the first actuation coil 5 can also be increased by other factors besides the current which flows within the first actuation coil 5. For example, combined light beams incident on the MEMS micro-mirror 4 will increase the temperature of the first actuation coil 5, and also atmospheric heat, or heat from other electrical components located near the MEMS micro-mirror device 1 will increase the temperature of the first actuation coil 5.

Typically the portion of the first actuation coil 5 which cooperates with the MEMS micro-mirror 4 will have a larger cross-sectional area than the cross sectional area of the portion of the first actuation coil 5 which extends along the first torsional arm 3a. This is due to the fact that the first torsional arm 3a has less space to accommodate the first actuation coil 5 compared to the MEMS micro-mirror 4. As a result the electrical resistance of the portion of the first actuation coil 5 which extends along the first torsional arm 3a will be larger than the electrical resistance of the portion of the first actuation coil 5 which cooperates with the MEMS micro-mirror 4. Accordingly when the first actuation coil 5 conducts current the portion of the first actuation coil 5 which extends along the first torsional arm 3a will heat to a greater extent compared to the portion of the first actuation coil 5 which cooperates with the MEMS micro-mirror 4.

Furthermore, typically the portion of the first actuation coil 5 which cooperates with the MEMS micro-mirror 4 will be much longer than the portion of the first actuation coil 5 which extends along the first torsional arm 3a. Accordingly less heat dissipation will take place in the portion of the first actuation coil 5 which extends along the first torsional arm 3a as it is distributed over a smaller area compared to the portion of the first actuation coil 5 which cooperates with the MEMS micro-mirror 4.

It should be understood that the MEMS micro-mirror device 1 could alternatively be configured to enable oscillation of the MEMS micro mirror 4 about two orthogonal axes, so that the MEMS micro mirror 4 can scan light in two dimensions (typically along the horizontal and vertical). FIG. 2 shows a MEMS micro-mirror device 100 which is configured to enable oscillation of the MEMS micro mirror 4 about two orthogonal axes.

The MEMS micro-mirror device 20 has many of the same features of the MEMS micro-mirror device 1 shown in FIGS. 1a and 1b; however in the MEMS micro-mirror device 20 the support frame 2 is configured to be moveable; the support frame 2 is configured such that it can oscillate about a second oscillation axis 17, which is orthogonal to the first oscillation axis 7.

The MEMS micro-mirror device 20 further comprises a fixed part 12 (i.e. an immovably part); the support frame 2 is connected to the fixed part 12 via third and fourth torsional arms 13a,b. The third and fourth torsional arms 13a,b, define the second oscillation axis 17. A second actuation coil 15 is connected to the support frame 2. This second actuation coil 15 will also be submerged by the magnetic field 'B' generated by the magnet 6.

A second actuation coil 15 is supported on, and connected to, the support frame 2. The second actuation coil 15 is arranged to extend, from a first electrical contact 19a which is located on the fixed part 12, along the third torsional arm 13a, around the perimeter of the support frame 2 and back along the third torsional arm 13a to a second electrical contact 19b which is located on the fixed part 12. It should be noted that the second actuation coil 15 does not extend along the fourth torsional arm 13b.

Furthermore, in the MEMS micro-mirror device 20 the first and second electrical contacts 9a,9b for the first actuation coil 5 are located on the fixed part 12, and thus the first actuation coil 5 is arranged to also extend along the support frame 2 and the third and fourth torsional arms in order to electrically connect to the first and second electrical contacts 9a,9b.

During use an electric current 'i' is passed through the first actuation coil 5 which is connected to the MEMS micro mirror 4. As the first actuation coil 5 is submerged in the magnetic field 'B' created by the magnet 6 the first actuation coil 5 will provide a Laplace force which will be applied to the MEMS micro mirror 4. The Laplace force will cause the MEMS micro mirror 4 to oscillate about the first oscillation axis 7. An electric current 'I' is also passed through the second actuation coil 15 which is connected to the support frame 2. As the second actuation coil 15 is also submerged in the magnetic field 'B' created by the magnet 6, the second actuation coil 15 will provide a Laplace force which will be applied to the support frame 2. The Laplace force which is applied to the support frame 2 by the second actuation coil 15 will cause the support frame 2, and thus the MEMS micro mirror 4 which is connected to the support frame 2 via the torsional arms 13a,b, to oscillate about the second oscillation axis 17. Accordingly the MEMS micro mirror 4 will be oscillated about the first and second orthogonal oscillation axes 7,17. If the MEMS micro mirror 4 reflects light as it is oscillating about the first and second orthogonal oscillation axes 7,17 the reflected light will be scanned in two dimensions e.g. horizontal and vertical. This will, for example, enable combined light beams which the MEMS micro mirror 4 receives, to be scanned across the area of a projection screen in, for example, a zig-zag pattern.

The MEMS micro-mirror device 20 suffers from all those disadvantages discussed above with respect to the MEMS micro-mirror device 1; in addition to those disadvantages the MEMS micro-mirror device 20 also has the further disadvantages. As current is passed through the second actuation coil 15 the second actuation coil 15 will heat; this will result in an increase in the temperature of the third torsional arm 13a. The mechanical properties of the third torsional arm 13a will be influenced by the increase in temperature. As a result the mechanical properties of the third torsional arm 3a will differ from the mechanical properties of the fourth torsional arm 13b. For example, as the second actuation coil 15 heats, the third torsional arm 13a will heat and the flexibility of the third torsional arm 13a will increase; as a result the third torsional arm 13a will be more flexible than the fourth torsional arm 13b. Due to the difference in flexibility between the third and fourth torsional arms 13a,b, undesired parasitic movement of the support structure 2 (and thus the MEMS micro mirror) can result during operation.

In addition to the mechanical properties of the third torsional bar 13a, the electrical properties of the second actuation coil 15 will be influenced by the increase in temperature. The electrical resistance of the second actuation coil 15 increases with temperature. To maintain a predetermined scanning amplitude of the support frame 2 the Laplace force applied by the second actuation coil 15 to the support frame 2 should be maintained; to maintain the Laplace force a predetermined current which is conducted in the second actuation coil 15 must be maintained. As the electrical resistance of the second actuation coil 15 increases with temperature, a larger voltage is required in order to maintain the current at the predetermined current level. The requirement for a larger voltage means that the MEMS micro-mirror device 20 will have increased power consumption.

It will be understood that the temperature in the second actuation coil 15 can also be increased by other factors besides the current which flows within the second actuation coil 15. For example, combined light beams incident on the MEMS micro-mirror 4 will increase the temperature of the second actuation coil 15, and also atmospheric heat, or heat from other electrical components located near the MEMS micro-mirror device 100 will increase the temperature of the second actuation coil 15.

Typically the portion of the second actuation coil 15 which cooperates with the support frame 2 will have a larger cross-sectional area than the cross sectional area of the portion of the second actuation coil 15 which extends along the third torsional arm 13a. This is due to the fact that the third torsional arm 13a has less space to accommodate the second actuation coil 15 compared to the support frame 2. As a result the electrical resistance of the portion of the second actuation coil 15 which extends along the third torsional arm 13a will be larger than the electrical resistance of the portion of the second actuation coil 15 which cooperates with the support frame 2. Accordingly, when the second actuation coil 15 conducts current the portion of the second actuation coil 15 which extends along the third torsional arm 3a will heat to a greater extent compared to the portion of the second actuation coil 15 which cooperates with the support frame 2.

Furthermore, typically the portion of the second actuation coil 15 which cooperates with the support frame 2 will be much longer than the portion of the second actuation coil 15 which extends along the third torsional arm 13a. Accordingly less heat dissipation will take place in the portion of the second actuation coil 15 which extends along the third torsional arm 13a as it is distributed over a smaller area compared to the portion of the second actuation coil 15 which cooperates with the support frame 2.

It is an aim of the present invention to obviate or mitigate at least some of the above-mentioned disadvantages.

BRIEF SUMMARY OF THE INVENTION

According to the invention, there is provided a MEMS micro-mirror device comprising, a MEMS micro-mirror, a support structure and, a first and second torsional arm which each connect the MEMS micro-mirror to the support structure, wherein the first and second torsional arms are arranged to define a first oscillation axis about which the MEMS micro-mirror can oscillate; a single actuation coil for oscillating the MEMS micro mirror about the first oscillation axis, at least a portion of the single actuation coil being arranged to cooperate with the MEMS micro mirror; a magnet which is arranged such that a magnetic field generated by the magnet submerges at least the portion of the single actuation coil which cooperates with the MEMS micro mirror; wherein the single actuation coil is configured to extend along the first and second torsional arms.

In the present invention a single actuation coil for oscillating the MEMS micro mirror is provided. The single actuation coil extends over the two torsional arms provided in the MEMS micro-mirror device; the single actuation coil is distributed over a larger area compared to in MEMS micro-mirror devices known in the art wherein the actuation coil is confined to extending along only one of the torsional arms. As the single actuation coil is distributed over a larger area, the amount of heat which can be dissipated from the actuation coil will increase. As a result, the temperature, and thus the electrical resistance of the single actuation coil will be decreased; this will lead to a decrease in the overall power consumption of the MEMS micro-mirror device. Furthermore, as the same actuation coil (single actuation coil) cooperates with each of the first and second torsional arms, there will be no (or at least very little) temperature differences between the first and second torsional arms; as a result the mechanical properties of each of the first and second torsional arms will not vary during operation of the MEMS micro-mirror device.

The length of the single actuation coil which extends along the first torsional arm may be equal to the length the single actuation coil which extends along the second torsional arm.

Preferably a single portion of the single actuation coil extends along the first torsional arm.

Two or more different portions of the single actuation coil may extend along the first torsional arm.

Preferably a single portion of the single actuation coil extends along the second torsional arm.

Two or more different portions of the single actuation coil may extend along the second torsional arm.

Preferably the number of portions of the single actuation coil which extend along the first torsional arm are equal to the number of portions of the single actuation coil which extend along the second torsional arms.

Preferably, the electrical resistance of the portion of the single actuation coil which extends along the first torsional arm is equal to the electrical resistance of the portion of the single actuation coil which extends along the second torsional arm. Preferably, the cross sectional area of the portion of the single actuation coil which extends along the first torsional arm is equal to the cross sectional area of the portion of the single actuation coil which extends along the second torsional arm. Preferably, the width of the portion of the single actuation coil which extends along the first torsional arm is equal to the width of the portion of the single actuation coil which extends along the second torsional arm. Indeed the electrical resistance of each of the respective portions of the single actuation coil which extend along the first and second torsional arms respectively, is proportional to the length of the portion of single actuation coil and inversely proportional to the cross sectional area of the portion of the single actuation coil i.e. the electrical resistance of the portion of the single actuation coil which extends along the first torsional arm, and the electrical resistance of the portion of the single actuation coil which extends along the second torsional arm are each given by the equation $R=r_o*I/S$, wherein R is the electrical resistance of the respective portion of the single actuation coil, $r_o$ is the resistivity of the material of the single actuation coil, I is the length of the respective portion of the single actuation coil, and S is the cross sectional area of the portion of the single actuation coil.

The first and second torsional arms may connect to opposite sides of the MEMS micro-mirror so that they define the first oscillation axis.

The MEMS micro-mirror device may further comprise a heat sink which is arranged such that it is in thermal communication with the single actuation coil. The heat sink may be arranged such that it is in thermal communication with the portions of the actuation coil which extend along the first and second torsional arms. The heat sink may be configured to extend along the length of the first and second torsional arms. The heat sink may comprise a metallic coil.

The MEMS micro-mirror device may further comprise a first and second electrical contact located on the support structure which electrically connects to the single actuation coil. Preferably, the first electrical contact is located adjacent to the first torsional arm and the second electrical contact is located adjacent to the second torsional arm. Preferably the first and second electrical contacts electrically connect to opposite ends of the single actuation coil.

The MEMS micro-mirror device may further comprise a comparator circuit which is configured to measure an electrical parameter across the MEMS micro mirror. The comparator circuit may be further configured to compare the measured electrical parameter to a reference electrical parameter to determine if one of the torsional arms are broken. The electrical parameter may be voltage, resistance or current. For example, the MEMS micro-mirror device may further comprise a comparator circuit which is configured to measure the voltage across the MEMS micro mirror and to compare the measured voltage to a reference voltage. This will enable breakage of first or second torsional arms to be detected. If one of the first or second torsional arms the single actuation coil will be broken so as to create an open circuit; the open circuit will result in an increase in voltage drop across the MEMS micro mirror; the measured voltage will thus be larger than the reference voltage indicating that one of the torsional arms is broken.

The electrical comparator circuit may be electrically connected to the first and second electrical contacts so that it can measure the electrical parameter across the MEMS micro mirror.

The support structure may be configured to be a fixed structure. When the support structure is configured to be a fixed structure then the support structure will be immovable. In such cases the MEMS micro-mirror device will enable scanning of light in 1-dimension as the MEMS micro mirror will be moveable about the first oscillation axis only.

The support structure may alternatively be configured to be a movable structure. The support structure may be configured to oscillate about a second oscillation axis. The second oscillation axis may be orthogonal to the first oscillation axis. In such a case the MEMS micro-mirror device will enable scanning of light in 2-dimensions as the MEMS micro mirror will be moveable about the first and second orthogonal oscillation axes.

The MEMS micro-mirror device may further comprise a fixed part and the support structure may comprises a third and fourth torsional arm which each connect the support structure to the fixed part. The third and fourth torsional arms are arranged to define a second oscillation axis about which the support structure can oscillate. The second oscillation axis may be orthogonal to the first oscillation axis.

The third and fourth torsional arms may connect to opposite sides of the support structure so that they define the second oscillation axis. Preferably the first and second torsional arms are arranged such that a longitudinal axis of the first torsional arm and a longitudinal axis of the second torsional arm are in alignment. Preferably the third and fourth torsional arms are arranged such that a longitudinal axis of the third torsional arm and a longitudinal axis of the fourth torsional arm are in alignment. Preferably the longitudinal axes of the first and second torsional arms are orthogonal to the longitudinal axes of the third and fourth torsional arms.

The MEMS micro-mirror device may further comprise a single actuation coil for oscillating the support structure about the second oscillation axis. For clarity, the single actuation coil for oscillating the support structure about the second oscillation axis will be referred to as the second, single, actuation coil.

The second, single, actuation coil may be arranged to cooperate with the support structure. The second, single, actuation coil may be configured to extend along the third and fourth torsional arms.

The magnet may be further arranged such that a magnetic field generated by the magnet submerges at least the portion of the second, single, actuation coil. Preferably the magnet is arranged such that a magnetic field generated by the magnet submerges at least the portion of the second actuation coil which cooperates with the support structure.

The length the second, single, actuation coil which extends along the third torsional arm may be equal to the length of the second, single, actuation coil which extends along the fourth torsional arm.

The number of portions of second, single, actuation coil which extend along the third torsional arm may be equal to the number of portions of the second, single, actuation coil which extend along the fourth torsional arm.

Preferably a single portion of the second, single, actuation coil extends along the third torsional arm. Two or more different portions of the second, single, actuation coil may extend along the third torsional arm.

Preferably a single portion of the second, single, actuation coil extends along the fourth torsional arm. Two or more different portions of the second, single, actuation coil may extend along the second torsional arm.

Preferably, the electrical resistance of the portion of the second single actuation coil which extends along the third torsional arm is equal to the electrical resistance of the portion of the second single actuation coil which extends along the fourth torsional arm. Preferably, the cross sectional area of the portion of the second single actuation coil which extends along the third torsional arm is equal to the cross sectional area of the portion of the second single actuation coil which extends along the fourth torsional arm. Preferably, the width of the portion of the second single actuation coil which extends along the third torsional arm is equal to the width of the portion of the second single actuation coil which extends along the fourth torsional arm. Indeed the electrical resistance of each of the respective portions of the second single actuation coil which extend along the third and fourth torsional arms respectively, is proportional to the length of the portion of coil and inversely proportional to the cross sectional area of the portion of the coil i.e. the electrical resistance of the portion of the second single actuation coil which extends along the third torsional arm, and the electrical resistance of the portion of the second single actuation coil which extends along the fourth torsional arm are each given by the equation $R = r_o * I/S$, wherein R is the electrical resistance of the respective portion of the second single actuation coil, $r_o$ is the resistivity of the material of the second single actuation coil, I is the length of the respective portion of the second single actuation coil, and S is the cross sectional area of the respective portion of the second single actuation coil.

The MEMS micro-mirror device may further comprise a heat sink which is arranged such that it is in thermal communication with the second, single, actuation coil. This heat sink may be the same heat sink which is in thermal communication with the single actuation coil for oscillating the MEMS micro mirror about the first oscillation axis.

The heat sink may be arranged such that it is in thermal communication with the portions of the second, single, actuation coil which extend along the third and fourth torsional arms.

The heat sink may be configured to extend along the length of the third and fourth torsional arms.

The heat sink may comprise a metallic coil.

The MEMS micro-mirror device may further comprise a first and second electrical contact located on the fixed part which electrically connect to the single actuation coil which oscillates the MEMS micro mirror about the first oscillation axis. The MEMS micro-mirror device may further comprise a third and fourth electrical contact located on the fixed part which electrically connects to the second, single, actuation coil which oscillates the support structure about the second oscillation axis. Preferably, the first and third electrical contacts are located adjacent to the third torsional arm and the second and fourth electrical contacts are located adjacent to the fourth torsional arm.

The MEMS micro-mirror device may further comprise a second comparator circuit which is configured to measure an electrical parameter across the fixed part. The second comparator circuit is preferably further configured to compare the measured electrical parameter to a reference electrical parameter. The electrical parameter may be voltage, resistance or current. For example, the MEMS micro-mirror device may further comprise a comparator circuit which is configured to measure voltage across the fixed part and compare the measured voltage to a reference voltage. This will enable breakage of third or fourth, torsional arms to be detected.

The second comparator circuit may be electrically connected to the third and fourth electrical contacts so that it can measure the electrical parameter.

The single actuation coil which oscillates the MEMS micro mirror about the first oscillation axis is further arranged to extend along the third and fourth torsional arms. In this embodiment, the single actuation coil which oscillates the MEMS micro mirror about the first oscillation axis, and the second, single, actuation coil which oscillates the support structure about the second oscillation axis, will each extend along the third and fourth torsional arms; while the single actuation coil only will extend along the first and second torsional arms.

The length of the single actuation coil which extends along the third torsional arm is equal to the length the single actuation coil which extends along the fourth torsional arm.

Preferably a single portion of the single actuation coil extends along the third torsional arm. Two or more different portions of the single actuation coil may extend along the third torsional arm.

Preferably a single portion of the single actuation coil extends along the fourth torsional arm. Two or more different portions of the single actuation coil may extend along the fourth torsional arm.

The heat sink which is configured to extend along the length of the third and fourth torsional arms and which is in thermal communication with the second, single, actuation coil, may be further arranged to be in thermal communication with portions of the single actuation coil which extend along the third and forth torsional arms.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 3:
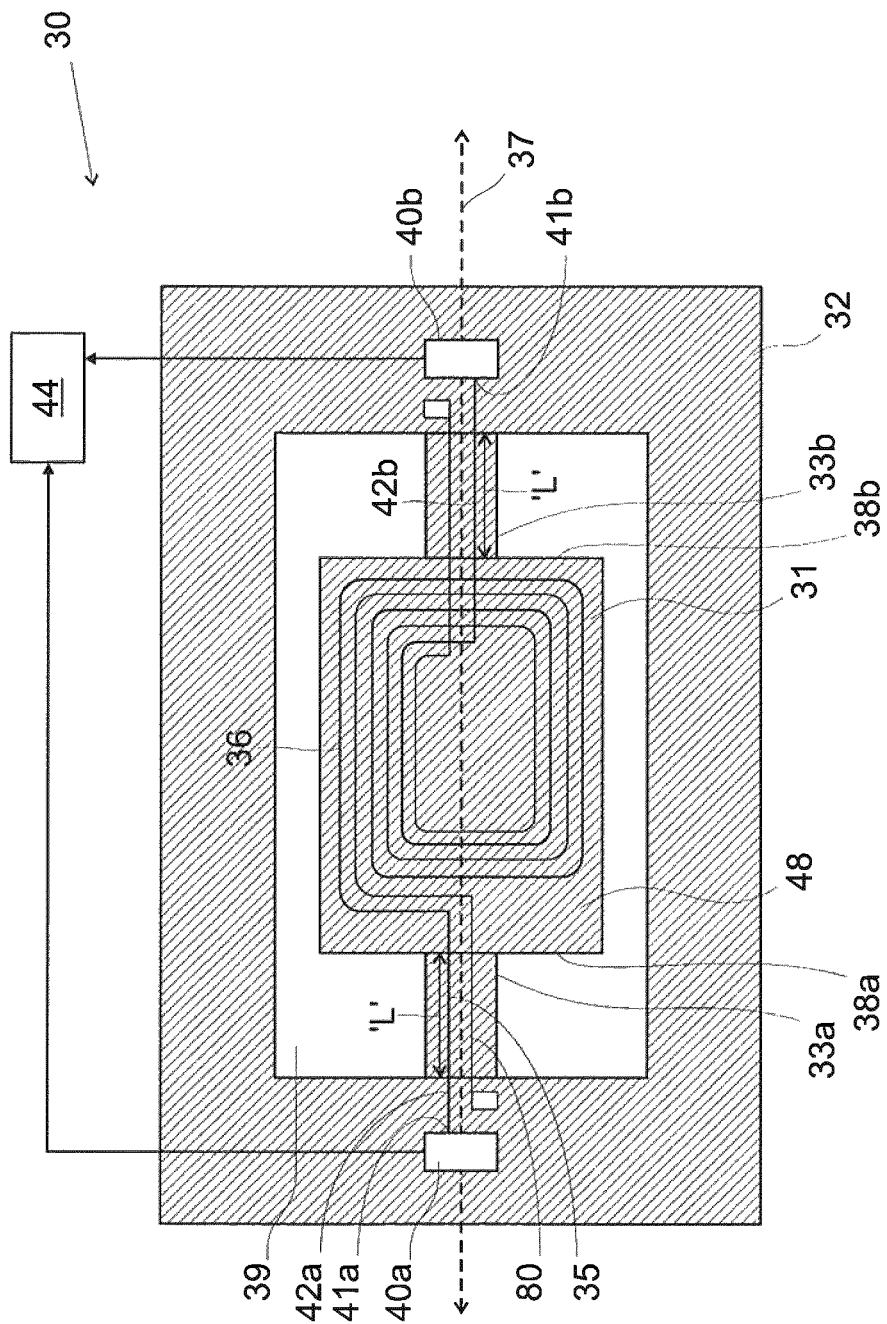
FIG. 3 shows an aerial view of an embodiment of MEMS micro mirror device according to a first embodiment of the present invention.

FIG. 3 shows an aerial view of an embodiment of MEMS micro mirror device 30 according to a first exemplary embodiment of the present invention.

The MEMS micro-mirror device 30 comprises, a MEMS micro-mirror 31, a support structure 32 and, a first and second torsional arm 33a,b which each connect the MEMS micro-mirror 31 to the support structure 32.

In this embodiment the support structure 32 is configured to be a fixed structure i.e. the support structure 32 is configured to be immovable.

The first and second torsional arms 33a,b are arranged to define a first oscillation axis 37 about which the MEMS micro-mirror 31 can oscillate. The first and second torsional arms 33a,b connect to opposite sides 38a,b of the MEMS micro-mirror 31 so that they define the first oscillation axis 37. A MEMS micro-mirror 31 oscillates about the first oscillation axis 37, the MEMS micro-mirror device 1 can deflect light so that the light is scanned in 1-dimension (e.g. horizontally or vertically).

The MEMS micro-mirror device 30 comprises a single actuation coil 35 for oscillating the MEMS micro mirror 31 about the first oscillation axis 37. At least a portion 36 of the single actuation coil 35 is arranged to cooperate with the MEMS micro mirror 31. In this example the portion 36 of the single actuation coil 35 is glued to an undersurface 48 of the MEMS micro mirror 31. However, it will be understood any other suitable cooperation could be used e.g. the single actuation coil 35 could be embedded in the MEMS micro mirror 31.

The support structure 32 is supported on a magnet 39. The magnet 39 is arranged such that a magnetic field generated by the magnet submerges at least the portion 36 of the single actuation coil 35 which cooperates with the MEMS micro mirror 31.

The single actuation coil 35 is configured to extend along the first and second torsional arms 33a,b. The length 'L' of the single actuation coil 35 which extends along the first torsional arm 33a is equal to the length 'L" of the single actuation coil 35 which extends along the second torsional arm 33b. In this example the single actuation coil 35 extends once along the first and second torsional arms 33a,b; therefore a single portion 42a of the single actuation coil 35 extends along the first torsional arm 33a and a single portion 42b of the single actuation coil 35 extends along the second torsional arm 33b. It will be understood that, alternatively, the single actuation coil 35 could be arranged such that it passes more than once along the first and second torsional arms 33a,b so that two or more different portions of the single actuation coil extend along each of the first and second torsional arms 33a,b.

The MEMS micro-mirror device 30 further comprises a first and second electrical contact 40a,b located on the support structure 32. The first electrical contact 40a is located adjacent to the first torsional arm 33a and the second electrical contact 40b is located adjacent to the second torsional arm 33b. The single actuation coil 35 electrically connects to the first electrical contact 40a at a first end 41a of the single actuation coil 35 and connects to the second electrical contact 40b as a second, opposite, end 41b of the single actuation coil 35.

The MEMS micro-mirror device further comprises a heat sink, in the form of metallic coil 80, which is arranged such that it is in thermal communication with the single actuation coil 35. Specifically, the metallic coil 80 is arranged such that it is in thermal communication with the portions 42*a,b* of the single actuation coil 35 which extend along the first and second torsional arms 33*a,b* and to be in thermal communication with the portion 36 of the single actuation coil 35 which cooperates with the MEMS micro mirror 31. In this example the metallic coil 80 is arranged to be adjacent to the single actuation coil 35 so that it is in thermal communication with the single actuation coil 35.

Figure 1A:
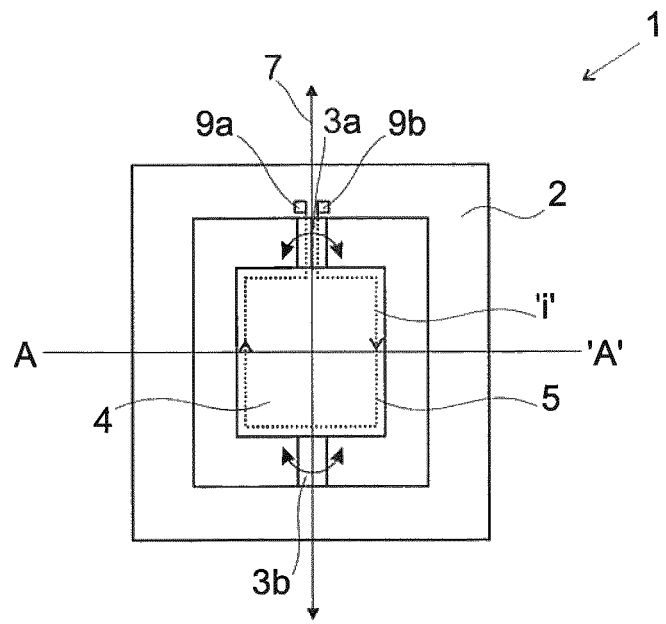
FIG. 1a shows an aerial view of a known MEMS micro mirror device.
Figure 1B:
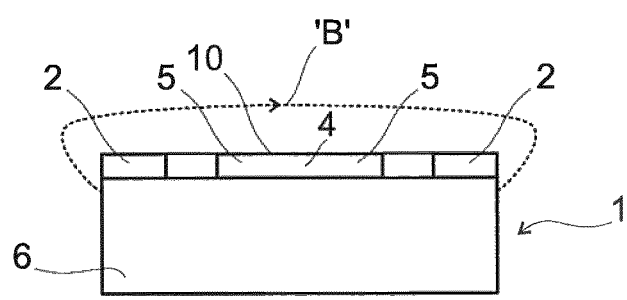
FIG. 1b shown a cross sectional view of the MEMS micro mirror device shown in FIG. 1a along A-A'.

The MEMS micro-mirror device 30 operates in the same manner as the MEMS micro-mirror device 1 shown in FIG. 1. A current source is connected to the first electrical contact 40*a* and the second electrical contact is connected to electrical ground. The current source is operated to supply current to the single actuation coil 35 via the first electrical contact 40*a*. The current is conducted along the single portion 42*a* of the single actuation coil 35 which extends along the first torsional arm 33*a*, along the portion 36 of the single actuation coil 35 which cooperates with the MEMS micro mirror 31, and then along the portion 42*b* of the single portion 42*b* of the single actuation coil 35 which extends along the second torsional arm 33*b*. As the single actuation coil 35 is submerged in a magnetic field generated by the magnet 39, when the portion 36 of the single actuation coil 35 conducts current the portion 36 of the single actuation coil 35 will apply a Laplace force to the MEMS micro mirror 31. The Laplace force will cause the MEMS micro mirror 31 to oscillate about the first oscillation axis 37. Light beams which are incident on the MEMS micro mirror 31 will be scanned along 1-dimensions as the MEMS micro mirror 31 oscillates about the first oscillation axis 37.

As the single actuation coil 35 extends along both the first and second torsional arms 33*a,b* the single actuation coil 35 is distributed over a larger area compared to the MEMS micro-mirror devices known in the art wherein the actuation coil is confined to extending along only one of the torsional arms. As the single actuation coil 35 is distributed over a larger area, the amount of heat which can be dissipated from the single actuation coil 35 will increase. As a result, the temperature, and thus the electrical resistance of the single actuation coil 35 will be decreased; this will lead to a decrease in the overall power consumption of the MEMS micro-mirror device 30 during operation. Furthermore, as the same actuation coil (single actuation coil 35) cooperates with each of the first and second torsional arms 33*a,b* there will be little or no temperature differences between the first and second torsional arms 33*a,b*; as a result the mechanical properties of each of the first and second torsional arms 33*a,b* will not vary during operation of the MEMS micromirror device 30.

Additionally, as single actuation coil 35 is arranged to pass only once along each of the first and second torsional arms 33*a,b* so that the resistance of the single actuation coil 35 is maintained at a minimum. Furthermore as single actuation coil 35 is arranged to pass only once along each of the first and second torsional arms 33*a,b* this ensures the amount of current conducting coil which extends along each torsional arm 33*a,b* is maintained at a minimum; this ensures that the heating of each torsional arm 33*a,b* during operation is kept to a minimum. The metallic coil 80 which defines a heat sink will further increase the amount of heat dissipated from the single actuation coil 35 thus reducing the electrical resistance of the single actuation coil 35 even further.

As shown in FIG. 3 the MEMS micro-mirror device 30 further comprises a comparator circuit 44 which is configured to measure an electrical parameter across the MEMS micro mirror 31. The comparator circuit 44 is further configured to compare the measured electrical parameter to a reference electrical parameter in order to monitor if one of the first or second torsional arms 33*a,b* break. In this particular example, the comparator circuit 44 is configured to measure the voltage across the MEMS micro mirror 31 and to compare the measured voltage to a reference voltage. The reference voltage in this example is set to be equal to the voltage which is measured across the MEMS micro mirror 41 when the MEMS micro-mirror device 30 is in normal operation. The electrical comparator circuit 44 is electrically connected to the first and second electrical contacts 40*a,b* so that it can measure the voltage across the MEMS micro mirror 31.

During operation if either of the first or second torsional arms 33*a,b* break, the single actuation coil 35 will in turn be broken as the single actuation coil extends along each of the torsional arms 33*a,b*. If either of the first or second torsional arms 33*a,b* break then the single actuation coil 35 will break along the portion 40*a,b* of single actuation coil 35 which extends along the broken torsional arm 33*a,b*. The break in the single actuation coil 35 will create a open circuit and the open circuit will result in an increase in voltage drop across the MEMS micro mirror 31. Accordingly, the measured voltage will thus be larger than the reference voltage indicating that one of the torsional arms 33*a,b*, is broken.

It will be understood that the comparator circuit 44 could alternatively be configured to measure another electrical parameter such as electrical resistance or current across the MEMS micro mirror 31; the measured electrical resistance or current can be used in an a similar manner to determine if one of the torsional arms 33*a,b*, is broken.

Figure 4:
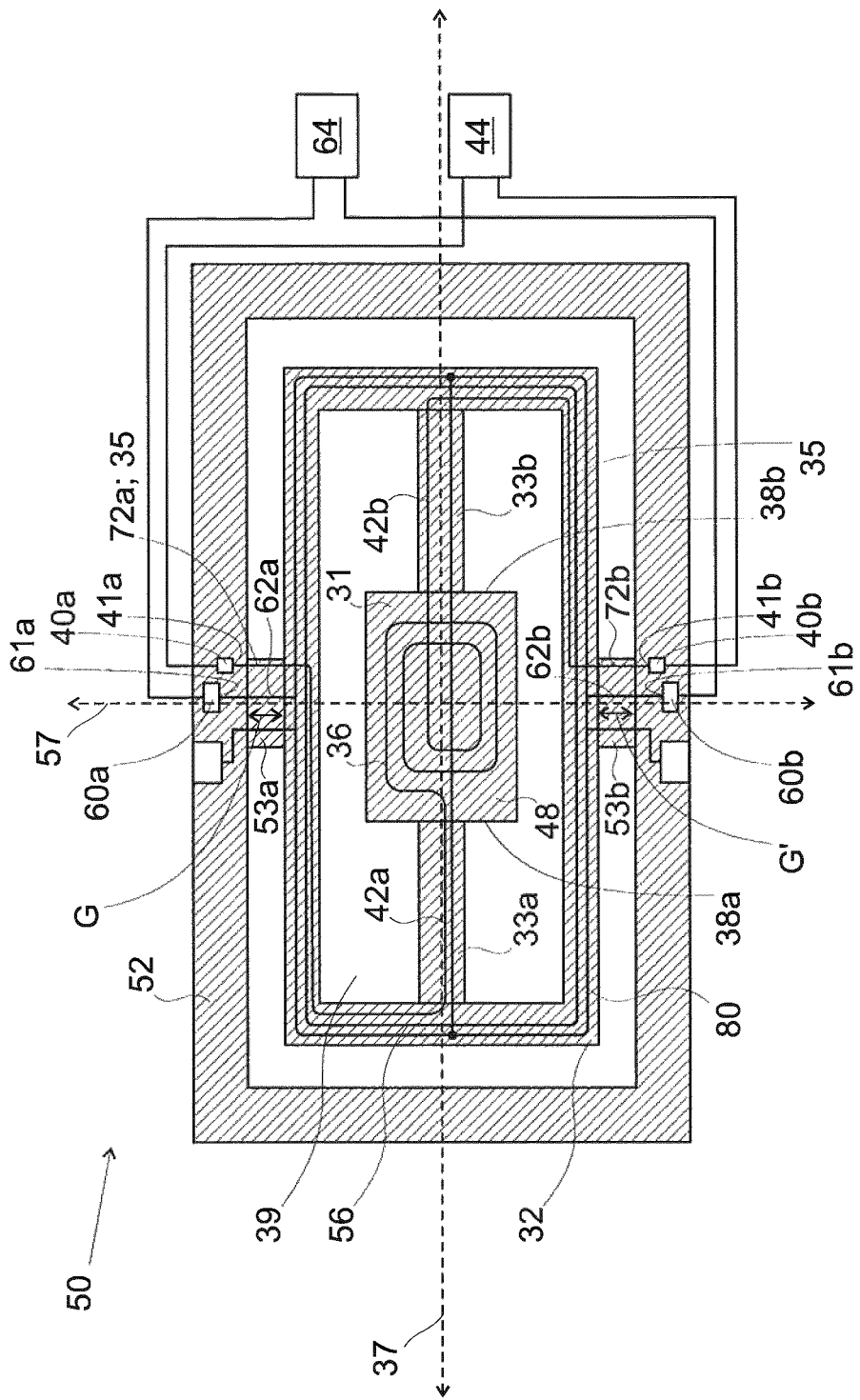
FIG. 4 shows an aerial view of an embodiment of MEMS micro mirror device according to a further embodiment of the present invention.

FIG. 4 shows an aerial view of a further embodiment of a MEMS micro mirror device 50 according to a further embodiment of the present invention. The MEMS micro mirror device 50 has many of the same features of the MEMS micro-mirror device 30 shown in FIG. 3 and like features are awarded the same reference numbers.

Unlike MEMS micro-mirror device 30 shown in FIG. 3, in the MEMS micro mirror device 50 shown in FIG. 4 the support structure 32 is configured to be moveable. Therefore the support structure 32 is not supported on the magnet 38 but rather is configured to oscillate freely about a second oscillation axis 57. The second oscillation 57 axis is orthogonal to the first oscillation axis 37. Since the MEMS micro-mirror device 50 comprises two orthogonal axes of oscillation 37,57, the MEMS micro mirror 31 can be moved about the first and second orthogonal oscillation axes 37,57 to scan light in 2-dimensions (e.g. horizontally and vertically).

The MEMS micro-mirror device 50 further comprises a fixed part 52 which is supported on a magnet 39.

The support structure 32 comprises a third and fourth torsional arm 53*a,b* which each connect the support structure 32 to the fixed part 52. The third and fourth torsional arms 53*a,b* connect to opposite sides 58*a,b* of the support structure 32 so that they are arranged to define the second oscillation axis 57 about which the support structure 32 can oscillate. The first and second torsional arms 33*a,b* are arranged such that they are in alignment, and the third and fourth torsional arms 53*a,b* are arranged such that they are in alignment; the third and fourth torsional arms 53*a,b* are orientated orthogonal to the first and second torsional arms 33a,b so that the second oscillation axis 57 is orthogonal to the first oscillation axis 37.

The MEMS micro-mirror device 50 further comprises a single actuation coil 55 for oscillating the support structure 32 about the second oscillation axis 57. For clarity, the single actuation coil 55 for oscillating the support structure 32 about the second oscillation axis 57 will be referred to as the second, single, actuation coil 55. A portion 56 of the second, single, actuation coil 55 is arranged such it cooperates with the support structure 32. In this particular example portion 56 of the second, single, actuation coil 55 is glued to the support structure 32. However, it will be understood any other suitable cooperation could be used e.g. the portion 56 of the second, single, actuation coil 55 could be embedded in the support structure 32.

The magnet 39 is arranged such that a magnetic field generated by the magnet submerges at least the portion 36 of the single actuation coil 35 which cooperates with the MEMS micro mirror 31, and submerges at least the portion 56 of the second, single, actuation coil which cooperates with the support structure 32.

The second, single, actuation coil 55 is configured to extend along the third and fourth torsional arms 53a,b. The length 'G' of the second, single, actuation coil 55 which extends along the third torsional arm 53a is equal to the length 'G'' of the second, single, actuation coil 55 which extends along the fourth torsional arm 53b. In this example the second, single, actuation coil 55 extends once along the third and fourth torsional arms 53a,b; therefore a single portion 62a of the second, single, actuation coil 55 extends along the third torsional arm 53a and a single portion 62b of the second, single, actuation coil 55 extends along the fourth torsional arm 53b. It will be understood that, alternatively, the second, single, actuation coil 55 could be arranged such that it passes more than once along the third and fourth torsional arms 53a,b so that two or more different portions of the second, single, actuation coil 55 extend along each of the third and fourth torsional arms 33a,b.

The MEMS micro-mirror device 50 further comprises a third and fourth electrical contact 60a,b located on the support structure 32. The third electrical contact 60a is located adjacent to the third torsional arm 53a and the fourth electrical contact 40b is located adjacent to the fourth torsional arm 33b. The second, single, actuation coil 55 electrically connects to the third electrical contact 60a at a first end 61a of the second, single, actuation coil 55 and electrically connects to the fourth electrical contact 60b at a second, opposite, end 61b of second, single, actuation coil 55.

In the MEMS micro mirror device 50 the first and second electrical contacts 40a,b are located on the fixed structure 52. The first electrical contact 40a is located adjacent to the third torsional arm 53a and the second electrical contact 40b is located adjacent to the fourth torsional arm 53b. The single actuation coil 35 electrically connects to the first electrical contact 40a at a first end 41a and electrically connects to the second electrical contact 40b at a second, opposite, end 41b of the single actuation coil 35. The first and third electrical contacts 40a, 60a are located adjacent to the third torsional arm 53a and the second and fourth electrical contacts 40b,60b are located adjacent to the fourth torsional arm 53b.

In the MEMS micro mirror device 50 the single actuation coil 35 which oscillates the MEMS micro mirror 31 about the first oscillation axis 37 is further arranged to extend along the third and fourth torsional arms 53a,b. Therefore, in the MEMS micro mirror device 50 both the single actuation coil 35 which oscillates the MEMS micro mirror 31 about the first oscillation axis 37, and the second, single, actuation coil 55 which oscillates the support structure 32 about the second oscillation axis 57, will each extend along the third and fourth torsional arms 53a,b; while the single actuation coil 35 only will extend along the first and second torsional arms 33a,b.

The length of the single actuation coil 35 which extends along the third torsional arm 53a is equal to the length the single actuation coil 35 which extends along the fourth torsional arm 53b. In the embodiment shown in FIG. 4 the single actuation coil 35 extends once along the along the third and fourth torsional arms 53a,b; therefore a single portion 72a of the single actuation coil 35 extends along the third torsional arm 53a and a single portion 72b of the single actuation coil 35 extends along the fourth torsional arm 53b. It will be understood that alternatively the single actuation coil 35 may be arranged such that it extends more than once along the along the third and fourth torsional arms 53a,b such that two or more different portions of the single actuation coil 35 extend along the third and fourth torsional arms 53a,b.

In the MEMS micro mirror device 50 the metallic coil 80 which defines the heat sink is arranged such that it is in thermal communication with both the single actuation coil 35 and the second, single, actuation coil 55. In particular, the metallic coil 80 is arranged to extend along the third and fourth torsional arms 53a,b, and to extend along the support structure 32, adjacent to both the single actuation coil 35 and the second, single, actuation coil 55. The metallic coil 80 is arranged to extend along the first and second torsional arms 33a,b, and to extend along micro mirror 31 adjacent to the single actuation coil 35. The proximity of the metallic coil 80 to the single actuation coil 35 and the second, single, actuation coil 55 will ensure that the metallic coil 80 is in thermal communication with both actuation coils 35,55 so that the metallic coil 80 can absorb heat from each actuation coil 80.

Figure 2:
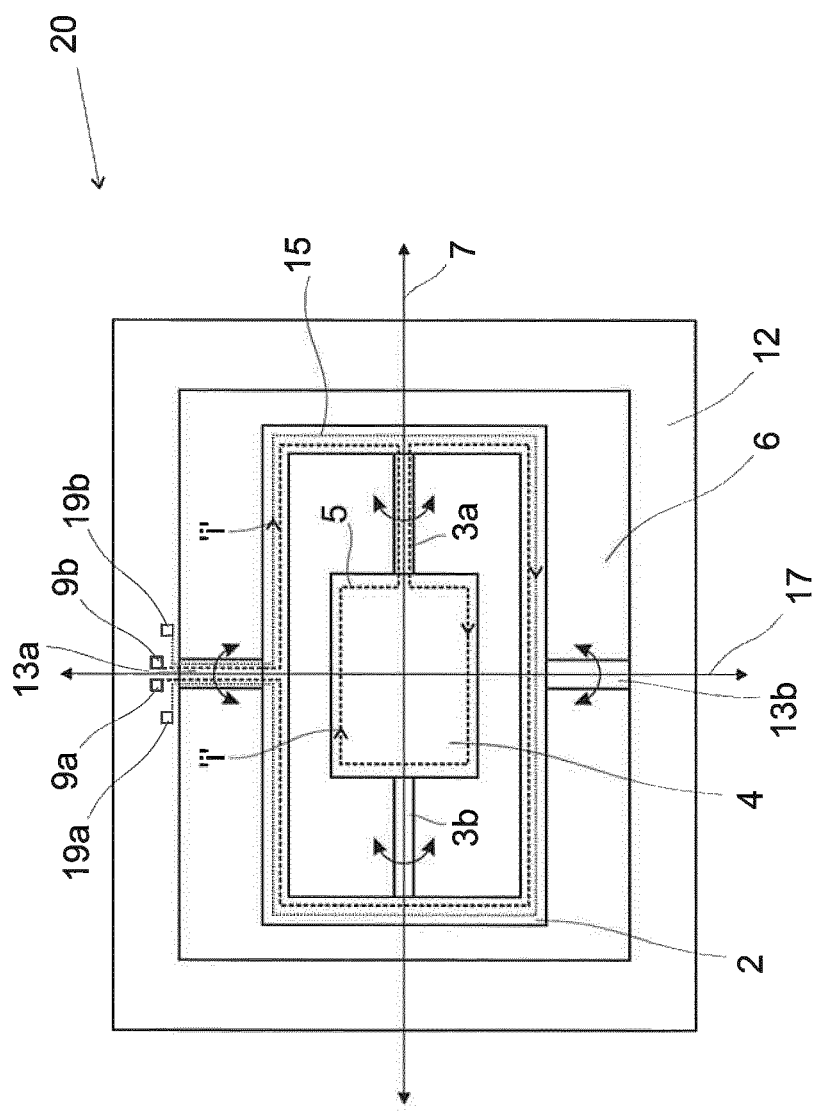
FIG. 2 shows an aerial view of another embodiment of a known MEMS micro mirror device.

The MEMS micro-mirror device 50 operates in the same manner as the MEMS micro-mirror device 20 shown in FIG. 2. The MEMS micro mirror 31 is oscillated about its first oscillation axis 37 in the same manner as described above for the MEMS micro-mirror device 30 shown in FIG. 3.

A current source is also connected to the third electrical contact 60a and the fourth electrical contact 60b is connected to electrical ground. The current source is operated to supply current to the second, single, actuation coil 55 via the third electrical contact 40a. The current is conducted along the single portion 62a of the second, single, actuation coil 55 which extends along the third torsional arm 53a, along the portion 56 of the second, single, actuation coil 55 which cooperates with the support structure 32, and then along the portion 62b of the second, single, actuation coil 55 which extends along the fourth torsional arm 53b. As second, single, actuation coil 55 is submerged in a magnetic field generated by the magnet 39, when the portion 56 of the second, single, actuation coil 55 conducts current the portion 56 of the second, single, actuation coil 55 will apply a Laplace force to the support structure 32. The Laplace force will cause the support structure 32 to oscillate about the second oscillation axis 37. The oscillation of the support structure 32 about the second oscillation axis 37 will effect oscillation of the MEMS micro mirror 31 about the second oscillation axis 37. The MEMS micro mirror 31 will thus be oscillated about the first and second orthogonal oscillation axes 37,57. Light beams which are incident on the MEMS micro mirror 31 will be scanned along 2-dimensions as the MEMS micro mirror 31 oscillates about the first and second orthogonal oscillation axes 37,57.

As the second, single, actuation coil 55 extends along both the third and fourth torsional arms 53a,b the second, single, actuation coil 55 is distributed over a larger area compared to the MEMS micro-mirror devices known in the art wherein the actuation coil for oscillating the support structure is confined to extending along only one of the torsional arms. As the second, single, actuation coil 55 is distributed over a larger area, the amount of heat which can be dissipated from the second, single, actuation coil 55 will increase. As a result, the temperature, and thus the electrical resistance of the second, single, actuation coil 55 will be decreased; this will lead to a decrease in the overall power consumption of the MEMS micro-mirror device 50. Furthermore, as the same actuation coil (second, single, actuation coil 55) cooperates with each of the third and fourth torsional arms 53a,b there will be little or no temperature differences between the third and fourth torsional arms 53a,b; as a result the mechanical properties of each of the third and fourth torsional arms 53a,b will not vary during operation of the MEMS micro-mirror device 50.

Additionally, as the second, single, actuation coil 55 is arranged to pass only once along each of the third and fourth torsional arms 53a,b the amount of current conducting coil which extends along each torsional arm 53a,b is maintained at a minimum; this ensures that the heating of each torsional arm 53a,b during operation is kept to a minimum. The metallic coil 80 which defines the heat sink will further increase the amount of heat dissipated from the second, single, actuation coil 55 thus reducing the electrical resistance of the second, single, actuation coil 55 even further.

The MEMS micro-mirror device 50 further comprises a second comparator circuit 64 which is configured to measure an electrical parameter across the fixed part 52. Like the first comparator circuit 44 the second comparator circuit 64 is further configured to compare the measured electrical parameter to a reference electrical parameter. The electrical parameter may be voltage, resistance or current. In the MEMS micro-mirror device 50 shown in FIG. 4 second comparator circuit 64 is configured to measure voltage across the fixed part 52 and compare the measured voltage to a reference voltage to determine if either of the third or fourth torsional arms 53a,b are broken. In this example the reference voltage is set to be equal to the voltage across the fixed part 52 when the MEMS micro-mirror device 50 is in normal operation. The second comparator circuit 64 is electrically connected to the third and fourth electrical contacts 60a,b so that it can measure the voltage across the fixed part 52.

During operation if either of the third or fourth torsional arms 53a,b break, the second, single, actuation coil 55 will in turn be broken along the portion 60a,b of the second, single, actuation coil 55 which extends along the broken torsional arm 53a,b; the break in the second, single, actuation coil 55 will create a open circuit and the open circuit will result in an increase in voltage drop across the fixed part 52. Accordingly, the measured voltage will thus be larger than the reference voltage indicating that one of the torsional arms 53a,b, is broken. It should be noted that the first comparator circuit 44 will operate in the same manner as described above for the MEMS micro-mirror device 30, to detect if either of the first or second torsional arms 33a,b have broken; although the first comparator circuit 44 will be electrically connected to the first and second electrical contact 40a,b which are now located on the fixed part 52.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A MEMS micro-mirror device comprising:
a micro-electro-mechanical-system (MEMS) micro-mirror;
a rectangular support structure;
a first torsional arm coupled to the MEMS micro-mirror and to a first side of the rectangular support structure;
a second torsional arm coupled to the MEMS micro-mirror and to a second side of the rectangular support structure, the second side opposite the first side, the first torsional arm and the second torsional arm to define a first oscillation axis of the MEMS micro-mirror, the first oscillation axis to bisect the first and the second side of the rectangular support structure;
an actuation coil operably coupled to the MEMS micro-mirror and extending along the first torsional arm and the second torsional arm; and
a magnet to generate a magnetic field to submerge at least a portion of the actuation coil, the magnetic field to cooperate with a current to be applied to the actuation coil to oscillate the MEMS micro-mirror about the first oscillation axis.

2. The MEMS micro-mirror device of claim 1, a first portion of the actuation coil extending along the first torsional arm and a second portion of the actuation coil extending along the second torsional arm, the length of the first portion substantially equal to the length of the second portion.

3. The MEMS micro-mirror device of claim 2, the cross sectional area of the first portion substantially equal to the cross sectional area of the second portion.

4. The MEMS micro-mirror device of claim 1, the actuation coil having a plurality of turns, the number of turns extending along the first torsional arm equal to the number of turns extending along the second torsional arm.

5. The MEMS micro-mirror device of claim 4, a single turn extending along the first torsional arm and a single turn extending along the second torsional arm.

6. The MEMS micro-mirror device of claim 1, comprising a heat sink in thermal communication with the actuation coil to dissipate heat from the actuation coil.

7. The MEMS micro-mirror device of claim 1, comprising a comparator circuit to measure an electrical parameter across the MEMS micro mirror and to compare the electrical parameter to a reference electrical parameter to determine whether the first torsional arm is broken, whether the second torsional arm is broken, or whether the first and the second torsional arms are broken.

8. A MEMS micro-mirror device, comprising:
a micro-electro-mechanical-system (MEMS) micro-mirror;
a support structure;
a first torsional arm coupled to the MEMS micro-mirror and to the support structure;
a second torsional arm coupled to the MEMS micro-mirror and to the support structure, the first torsional arm and the second torsional arm to define a first oscillation axis of the MEMS micro-mirror;
a rectangular fixed part;

a third torsional arm coupled to the support structure and to a first side of the rectangular fixed part;

a fourth torsional arm coupled to the support structure and to a second side of the rectangular fixed part, the second side opposite the first side, the third torsional arm and the fourth torsional arm to define a second oscillation axis of the MEMS micro-mirror, the second oscillation axis to bisect the first and the second side of the rectangular fixed part;

a first actuation coil operably coupled to the MEMS micro-mirror and extending along the first torsional arm, the second torsional arm, the third torsional arm, and the fourth torsional arm;

a magnet to generate a magnetic field to submerge at least a portion of the actuation coil, the magnetic field to cooperate with a current to be applied to the first actuation coil to oscillate the MEMS micro-mirror about the first oscillation axis.

9. The MEMS micro-mirror device of claim 8, the first oscillation axis substantially orthogonal to the second oscillation axis.

10. The MEMS micro-mirror device of claim 9, comprising a second actuation coil operably coupled to the MEMs micro-mirror to oscillate the MEMS micro-mirror about the second oscillation axis.

11. The MEMS micro-mirror device of claim 10, the second actuation extending along the third and fourth torsional arms.

12. The MEMS micro-mirror device of claim 11, a first portion of the second actuation coil extending along the third torsional arm and a second portion of the second actuation coil extending along the fourth torsional arm, the length of the first portion substantially equal to the length of the second portion.

13. The MEMS micro-mirror device of claim 12, the cross sectional area of the first portion substantially equal to the cross sectional area of the second portion.

14. The MEMS micro-mirror device of claim 11, the first actuation coil having a plurality of turns, the number of turns extending along the third torsional arm equal to the number of turns extending along the fourth torsional arm.

15. The MEMS micro-mirror device of claim 14, a single turn extending along the first torsional arm and a single turn extending along the second torsional arm.

16. The MEMS micro-mirror device of claim 11, comprising a heat sink in thermal communication with the first actuation coil and the second actuation coil to dissipate heat from the first and second actuation coils.

17. The MEMS micro-mirror device of claim 11, comprising a comparator circuit to measure an electrical parameter across the MEMS micro mirror and to compare the electrical parameter to a reference electrical parameter to determine whether any one of or more of the first torsional arm, the second torsional arm, the third torsional arm, or the fourth torsional arms are broken.

18. The MEMS micro-mirror device of claim 8, a first portion of the first actuation coil extending along the first torsional arm and a second portion of the first actuation coil extending along the second torsional arm, the length of the first portion substantially equal to the length of the second portion.

19. The MEMS micro-mirror device of claim 18, the cross sectional area of the first portion substantially equal to the cross sectional area of the second portion.

20. The MEMS micro-mirror device of claim 8, the first actuation coil having a plurality of turns, the number of turns extending along the first torsional arm equal to the number of turns extending along the second torsional arms.

21. The MEMS micro-mirror device of claim 8, a single turn extending along the first torsional arm and a single turn extending along the second torsional arm.

22. The MEMS micro-mirror device of claim 1, the first torsional arm and the second torsional arm to bisect the first and the second side of the rectangular support structure in half.

23. The MEMS micro-mirror device of claim 1, the third torsional arm and the fourth torsional arm to bisect the first and the second side of the rectangular fixed part in half.

* * * * *